March 11, 1947. J. M. STRANG 2,417,330
LENS FOR OPTICAL PURPOSES
Filed Jan. 31, 1942

JOHN MARTIN STRANG
INVENTOR
BY E. H. Bond
ATTORNEY

Patented Mar. 11, 1947

2,417,330

UNITED STATES PATENT OFFICE 2,417,330

LENS FOR OPTICAL PURPOSES

John Martin Strang, Glasgow W. 3, Scotland, assignor to Barr & Stroud, Limited, Glasgow, Scotland Application January 31, 1942, Serial No. 429,100

2 Claims. (Cl. 88—57)

This invention refers to lenses for optical purposes, and it is concerned with a lens form capable of general application, but particularly applicable to collimating lenses for use, for example, in illuminated gun sights, another application being to photographic camera lenses.

The object of the invention, broadly speaking, is the production of a lens in which the relative aperture, i. e. the ratio of aperture to focal length, will be comparatively large and the lens well corrected for spherical aberration when used in monochromatic or approximately monochromatic light.

Under this invention, compound lenses having spherical curves are envisaged having the characteristic that the difference in focus for the spectral colours C and F is at least 0.8% and at most 1.5% of the focal length of the lens.

Investigation has shown that improvement in the correction of spherical aberration can be made by a departure from the usually accepted method of correction of chromatism. Within the limits specified here, the corrections for spherical aberration are particularly favourable. If a difference of focus less than .8% of the focal length occurs between the C and F spectral colours, spherical aberrations of secondary and higher order predominate at the relative apertures contemplated by this invention; good correction of spherical aberration over the whole aperture is impossible. If the difference is more than 1.5%, the spherical aberration may be corrected only by producing lenses of greater curvature unsuitable for manufacture. Investigation also shows that with the colour glasses which may be used with these lenses, the spectral transmission is not nearly monochromatic enough to produce images sensibly free from colour defects.

Compound lenses in accordance with the invention may assume several varieties of form. In one example, the lens consists of a converging and a diverging component separated by an air space, both being simple lenses and the diverging component being preferably of a higher index of refraction and of power at least 30% of the power of the complete compound lens.

In another example, the compound lens consists of three components, the middle one being diverging and the others converging, the diverging component being of power equal to at least 25% of the power of the complete compound lens, and in still another example the compound lens consists of three components, the first or middle being compounded of two lens elements cemented together while the third component is single and nearest the focal plane and has thickness and curvatures so chosen that both are approximately or altogether aplanatic in relation to successive image points on the axis of the lens.

Some examples will now be described with reference to the accompanying drawing, in which the three figures shown diagrammatically three different lens forms in accordance with the invention.

Figure 1:
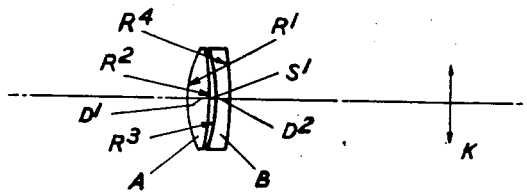
Figure 1 is a diagram of a lens embodying the present invention where the rear component consists of a single lens.

Figure 1 shows a compound lens consisting of a converging component A and a diverging component B separated by an air space, both being simple lenses. The image plane is indicated at K.

Particulars of the arrangement are as follows:

| Radius | Thickness or separation | Refractive index $n_d$ | Abbé $v$ number |
|---|---|---|---|
| $R^1 = +0.4277$ | $D^1 = 0.0843$ | 1.5085 | 64.0 |
| $R^2 = -2.227$ | $S^1 = 0.0186$ | | |
| $R^3 = -0.8171$ | $D^2 = 0.0614$ | 1.6480 | 34.2 |
| $R^4 = -1.801$ | | | |

Here the focal length is 1 unit, the aperture 0.37 and the difference in focus between the spectral colours C and F is 0.0101.

Figure 2:
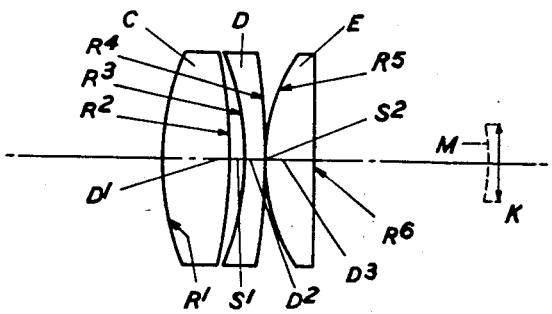
Figure 2 is a similar diagram having a rear component formed of a plurality of meniscus lenses.

Figure 2 shows a compound lens having three components C, D, E, the middle one D being diverging and the others converging. Particulars of this compound lens are as follows:

| Radius | Thickness or separation | Refractive index $n_d$ | Abbé $v$ number |
|---|---|---|---|
| $R^1 = +1.0170$ | $D^1 = 0.2715$ | 1.5085 | 64.0 |
| $R^2 = -2.3137$ | $S^1 = 0.0500$ | | |
| $R^3 = -1.1548$ | $D^2 = 0.0810$ | 1.6203 | 36.3 |
| $R^4 = -3.1508$ | $S^2 = 0.0$ | | |
| $R^5 = +0.7318$ | $D^3 = 0.2000$ | 1.5085 | 64.0 |
| $R^6 = \infty$ | | | |

Here the focal length is 1 unit, the aperture 0.84 and the difference of focus between the spectral colours C and F is 0.0101.

Figure 3:
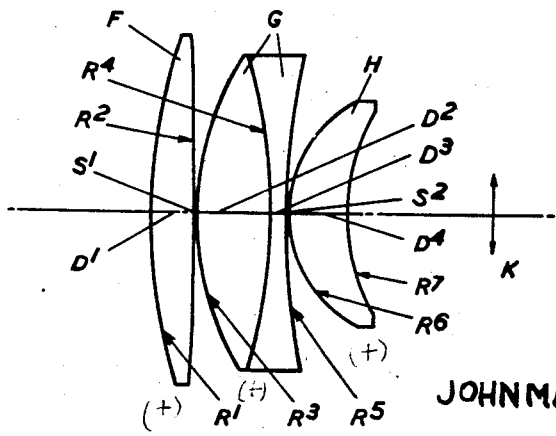
Figure 3 is a diagram of a lens suitable for focussing purposes.

Figure 3 shows a lens consisting of three components, F, G, H, the middle component G being made up of two single lenses cemented together. Particulars of this compound lens are as follows:

| Radius | Thickness or separation | Refractive index $n_d$ | Abbé $v$ number |
|---|---|---|---|
| $R^1=+2.1816$ | $D^1=0.1644$ | 1.5185 | 60.3 |
| $R^2=-8.4004$ | $S^1=0.0098$ | | |
| $R^3=+1.1413$ | $D^2=0.3224$ | 1.5185 | 60.3 |
| $R^4=-2.0894$ | $D^3=0.0661$ | 1.6203 | 36.3 |
| $R^5=+4.3923$ | $S^2=0.0098$ | | |
| $R^6=+0.5046$ | $D^4=0.2147$ | 1.5185 | 60.3 |
| $R^7=+0.8152$ | | | |

Here the focal length is 1 unit, the aperture 1.37 and the difference between the spectral colours C and F is 0.0112.

Any of the compound lenses illustrated in Figures 1, 2 and 3 may comprise, in addition to the components shown, a diverging component as indicated in dotted lines at M in Figure 2, the component M being of power at least equal to half the power of the complete compound lens and of thickness not more than one tenth of its focal length.

I claim:

1. A compound lens having spherical curves for which the difference in focus for the spectral colours C and F is at least 0.8% and at most 1.5% of the focal length of the lens, the lens consisting of a converging and a diverging component separated by an air space, both components being simple lenses and the diverging component being of higher refractive index than the converging component and its power being at least 30% of that of the complete lens.

2. An optical system including a compound lens having spherical curves for which the difference in focus for the spectral colours C and F is at least 0.8% and at most 1.5% of the focal length of the lens, the lens consisting of a converging and a diverging component, both simple lenses, separated by an air space, and the diverging component being of higher refractive index than the converging component and its power being at least 30% that of the complete lens, the diverging component being placed in the optical system on the side remote from the parallel light or long conjugate and being of concavo-convex form towards the long conjugate or parallel light.

J. MARTIN STRANG.

REFERENCES CITED

The following references are of record in the file of this patent:

UNITED STATES PATENTS

| Number | Name | Date |
|---|---|---|
| 1,910,115 | Luboshez | May 23, 1933 |
| 1,616,751 | Konig | Feb. 8, 1927 |
| 2,158,507 | Konig | May 16, 1939 |
| 2,076,190 | Wood | Apr. 6, 1937 |
| 415,040 | Hastings | Nov. 12, 1889 |
| 775,353 | Von Rohr | Nov. 22, 1904 |
| 1,468,762 | Taylor, et al. | Sept. 25, 1923 |

FOREIGN PATENTS

| Number | Country | Date |
|---|---|---|
| 316,246 | German | Nov. 24, 1919 |